United States Patent [19]

Salzer et al.

[11] Patent Number: 4,806,728
[45] Date of Patent: Feb. 21, 1989

[54] LASER PROCESS APPARATUS

[75] Inventors: Thomas E. Salzer, Bedford; David R. Whitehouse, Weston, both of Mass.

[73] Assignee: Raytheon Company, Lexington, Mass.

[21] Appl. No.: 150,804

[22] Filed: Feb. 1, 1988

[51] Int. Cl.⁴ ............................................. B23K 26/00
[52] U.S. Cl. ........................... 219/121.63; 219/121.74; 219/121.78; 350/616; 350/624
[58] Field of Search ...................... 219/121.63, 121.64, 219/121.74, 121.78, 121.68, 121.69, 121.67, 121.72; 350/612, 613, 617, 618, 616, 622, 623, 624

[56] References Cited

U.S. PATENT DOCUMENTS

| | | |
|---|---|---|
| 3,632,955 | 1/1972 | Cruickshank et al. ......... 219/85 BA |
| 4,327,277 | 4/1982 | Daly .............................. 219/121.64 |
| 4,564,739 | 1/1986 | Mattelin ...................... 219/121.78 X |
| 4,682,001 | 7/1987 | Locke ............................... 219/121.63 |
| 4,700,044 | 10/1987 | Hokanson et al. .......... 219/121.78 X |
| 4,754,381 | 6/1988 | Downs ............................. 350/612 X |

Primary Examiner—C. L. Albritton
Attorney, Agent, or Firm—Walter F. Dawson; Richard M. Sharkansky

[57] ABSTRACT

A computer controlled laser apparatus having multiple mirrors positioned along the locus of an ellipse having a first focus point at the center of an angle select mirror and a second focus point on a workpiece to be soldered. Such a geometrical configuration permits a computer to efficiently control the reflection of the laser beam onto the workpiece at different angles of incidence while maintaining a constant laser beam pathlength without requiring refocusing of the beam as it is moved from angle to angle.

26 Claims, 2 Drawing Sheets

LASER PROCESS APPARATUS

The Government has rights in this invention pursuant to Contract No. N00030-84-C-0036 awarded by the Department of the Navy.

BACKGROUND OF THE INVENTION

The invention relates to a laser process apparatus for creating a shaped heating pattern on a workpiece. More particularly, it relates to a laser soldering system having a programmable laser beam angle of incidence while maintaining a constant path length and having a programmable laser beam heating pattern.

A laser process system available in the prior art such as one used for soldering typically involves a simple focusing of the laser energy into a specific spatial distribution on a solder joint and adjusting the power level and duration to melt the solder so that the normal process of reflow and resolidification can occur. Mirrors are used to bend or move the laser beam and XY tables are used to move a workpiece. If the angle of incidence of the laser beam is changed to avoid obscuration of a solder site, then the laser beam pathlength changes requiring adjustments be made to the laser beam spot size by refocusing. If the angle of incidence cannot be varied, then a particular component being soldered may have to be repositioned requiring additional time and effort. In addition, if a coaxial TV image of the workpiece and the laser beam spot on the workpiece is being observed, changing of the path length requires reimaging of the TV view.

Components to be soldered have various shaped terminals although the most common solder joint shapes for soldering such terminals comprise a line and an annulus. Laser beams have been shaped to achieve desired heating patterns by many different optical techniques which often result in power loss through the optics or the techniques are not suitable for production environment use due to time consuming adjustments or geometrical limitations.

SUMMARY OF THE INVENTION

In accordance with the present invention, a laser apparatus is provided comprising programmable means for varying the angle of incidence of a laser beam on a workpiece and for providing laser generated heating patterns on the workpiece such as a printed circuit board in an efficient, reliable, and repetitive manner. The laser apparatus comprises means for generating a laser beam having a divergence in accordance with a desired impinging spot size of the laser beam on a workpiece, focusing means for adjusting the impinging spot size, and means for selecting one of a plurality of angles of incidence of the laser beam at the workpiece while maintaining a constant laser beam pathlength for each of the angles of incidence selected. A plurality of reflecting mirrors are positioned tangent to a locus of an ellipse and one of such reflecting mirrors is selected by an angle select mirror to reflect the laser beam to a constant point on a workpiece. A first focus point of the ellipse is located at the center of the angle select mirror and a second focus point is located at the constant point of impingement on the workpiece. In addition, means are provided for programming the shape of the laser beam to produce different heating patterns on the workpiece, and the laser apparatus further comprises means for viewing the workpiece and the spot size for anyone of the selected plurality of angles of incidence without having to readjust the spot size.

In accordance with the present invention, a laser soldering system is provided comprising means for generating a laser beam having an adjustable power level and duration, means positioned in a path of the laser beam for controlling the divergence of the laser beam in accordance with a desired impinging spot size on a workpiece, means for shaping the laser beam from the divergence controlling means to produce a desired heating pattern on the workpiece, means for focusing the impinging spot size of the laser beam on the workpiece, means for reflecting the laser beam while simultaneously transmitting visible light from the workpiece to a camera lens, means for selecting one of a plurality of angles of incidence of the laser beam at the workpiece to be soldered while maintaining a constant laser beam pathlength and a constant point of laser beam impingement on the workpiece and means for controlling the laser soldering system in accordance with soldering requirements of the workpiece. A dichroic mirror reflects the laser beam to the angle of incidence selecting means and transmits visible light to a camera lens to provide an image of the workpiece and a reflection of the focused laser beam on a TV monitor.

The present invention further provides a method of generating a localized heating pattern with a laser beam comprising the steps of generating the laser beam having a divergence in accordance with a desired impinging laser beam spot size on a workpiece, adjusting the impinging spot size on the workpiece using a focusing lens, and selecting one of a plurality of angles of incidence of the laser beam at the workpiece, the laser beam maintaining a constant pathlength for each of the angles of incidence selected. The step of selecting the laser beam angle of incidence further comprises the step of positioning an angle select reflecting means to direct the laser beam to one of a plurality of reflecting means positioned tangent to a locus of an ellipse having a first focus point at the center of the angle select reflecting means and a second focus point at the point of laser beam impingement on the workpiece. The method further comprises the step of shaping the laser beam to produce a desired heating pattern on the workpiece.

BRIEF DESCRIPTION OF THE DRAWINGS

Other and further features of the invention will become apparent in connection with the accompanying drawings wherein.

DESCRIPTION OF THE PREFERRED EMBODIMENT

Figure 1:
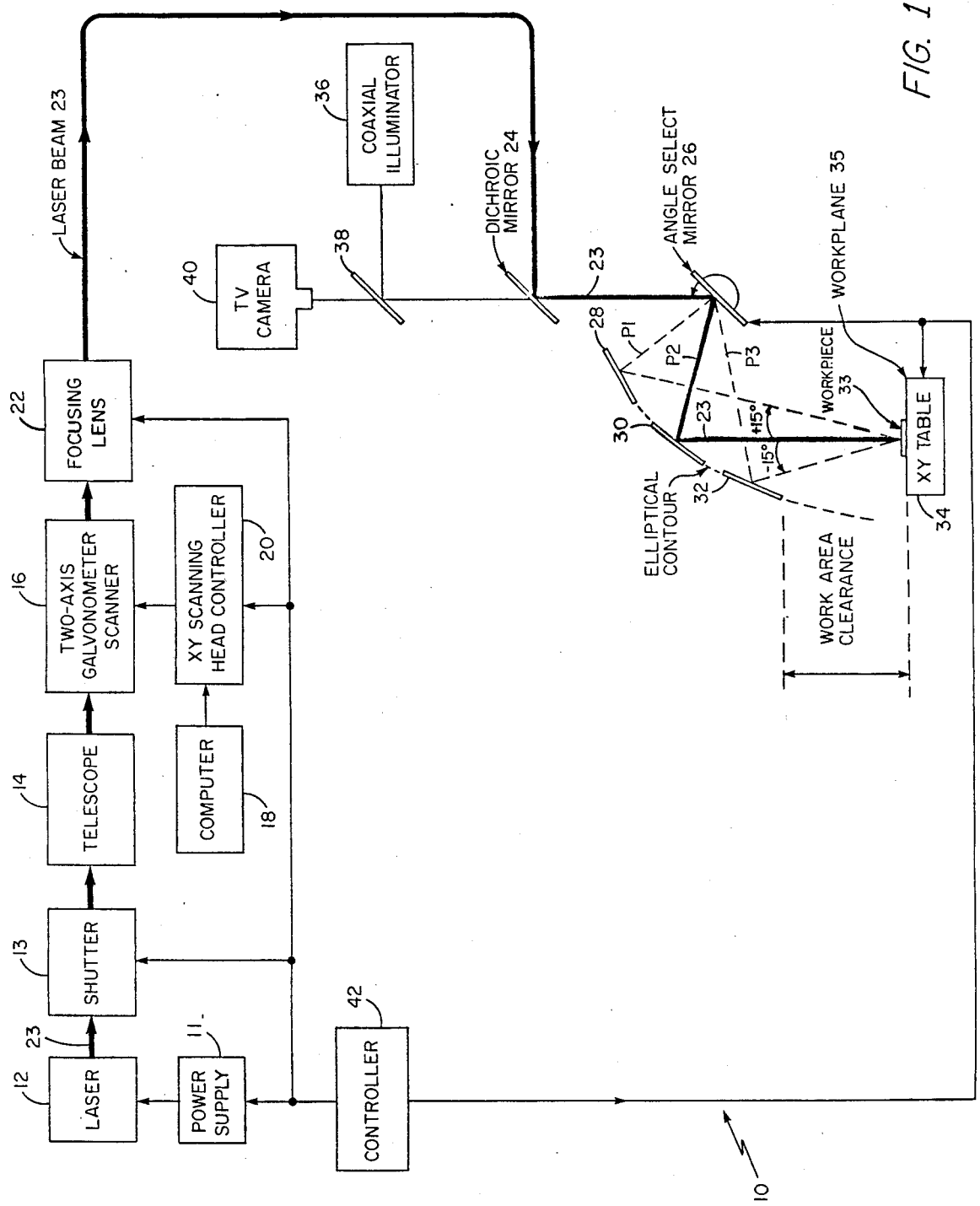
FIG. 1 is a block diagram of the present invention showing a laser process system having reflecting mirrors positioned on a locus of an ellipse for varying the angle of incidence of the laser beam while maintaining a constant path length and constant point of laser beam impingement.

Referring now to FIG. 1, there is shown a laser process system block diagram of the present invention. A continuous wave (CW) Nd:YAG laser 12 powered by a power supply 11 provides a laser beam 23. The laser beam 23 is directed at a shutter 13 that controls the transmission of the laser beam. When the shutter 13 is opened, the beam passes to a telescope 14 which collimates the beam and decreases the beam divergence to an order of 1 milliradian. From the telescope 14, the laser beam 23 proceeds to a two-axis galvanometer scanner 16 which scans the laser beam across a surface in any desired pattern under computer control. The scanner 16 is controlled by an XY scanning head controller 20 which is coupled to a programmable computer 18. The laser beam 23 then passes through a focusing lens 22 which focuses the beam at a point on a workpiece 33 which is positioned on a workplane 35 of an XY table 34. The focal length is typically 10 to 15 inches. The focusing lens 22 is moveable in the axial direction to bring the focal point of the laser beam 23 above the workplane 35 and effectively changes the laser beam spot size. The laser beam 23 then hits a dichroic mirror 24 which reflects the beam to a highly reflecting, angle-select mirror 26 having a DC servo motor for selecting three or more positions of mirror 26. The laser beam 23 is then reflected from one of the three reflecting mirrors 28, 30, 32 as determined by the angle-select mirror 26 to a point on the workpiece 33 positioned on the XY Table 34 where the laser soldering shall occur. The reflecting mirrors 28, 30 and 32 are positioned tangent to a locus of an ellipse whose foci are positioned at the center of the angle select mirror 26 and a point on the workpiece 33. Since the sum of the distances from the two foci to the locus of an ellipse is constant, a constant laser beam path length is maintained regardless of which one of the reflecting mirrors 28, 30, 32 is selected to direct the laser beam to the same point of impingement on the workpiece 33. The optical operational characteristics of the laser process system 10 for performing a soldering process are summarized in Table 1.

The laser process system 10 comprises a programmable controller 42 which supplies control signals to the power supply 11, shutter 13, XY scanning head controller 20, focusing lens 22, XY table 34 and angle select mirror 26. The controller 42 provides signals to the power supply 11 in order to control the power level of the laser beam and to the shutter 13 for controlling the duration of the laser power. The shutter is a fast shutter having a response time in the range of a few milliseconds. It is typically packaged with the laser 12. The controller 42 is coupled to the XY scanning head controller 20 which drives the two-axis galvanometer scanner 16; a program stored in the computer 18 coupled to the XY scanning head controller 20 determines the characteristic heating pattern of the laser beam which is executed upon command by signals provided by the controller 42.

TABLE 1

| Optical Operational Characteristics | |
|---|---|
| LASER | C.W. Nd:YAG, Quantronix model 116F or equivalent. |
| POWER | 2 to 15 watts, continuously adjustable UAC (under active control), delivered to horizontal workplace. |
| SHUTTER | internal shutter UAC, time to open/close less than .05 sec., open time adjustable 0.5 to 5.0 sec. |
| SPOT SIZE | .010 to .040 in. continously adjustable UAC at workplace. Preferred mode is to adjust the beam out-of-focus with the focal plane above the work plane. |
| ENERGY DIS-TRIBUTION | low order mode(s). |
| ANGLE OF INCIDENCE | choice of 3 beam angles UAC, 0° (normal), and ±15°. Desire all three beams |

TABLE 1-continued

| Optical Operational Characteristics | |
|---|---|
| | to strike workplane at the same point. Also acceptable to have three intersections aligned in X or Y. |
| BEAM SCANNING | ±X and ±Y independently UAC; amplitude from 0 to ±0.125 in.; rate from 0 to 40 hertz. profile linear and/or sinusoidal; combined scanning to achieve circular motion from 0 to 0.25 in. diameter. |
| VIEWING | normal coaxial closed circuit (CC) TV with adjustable coaxial illumination; maintain focus under choice of 3 beam angles in item 6; magnification: ¼ in. in workplace to cover ¼ to ½ of horizontal scan of TV system. Maintain focus under spot size changes. |
| BEAM SPOT VISUAL-IZATION | simultaneous with viewing in item 8; TEACH MODE: visualize beam spot at low power (2 watts) on CCTV with sensitivities adjusted to balance view of the workpiece; SOLDER MODE: visualize beam spot at high power (15 watts) on CCTV with sensitivities adjusted to balance view of the workpiece. |

Figure 2:
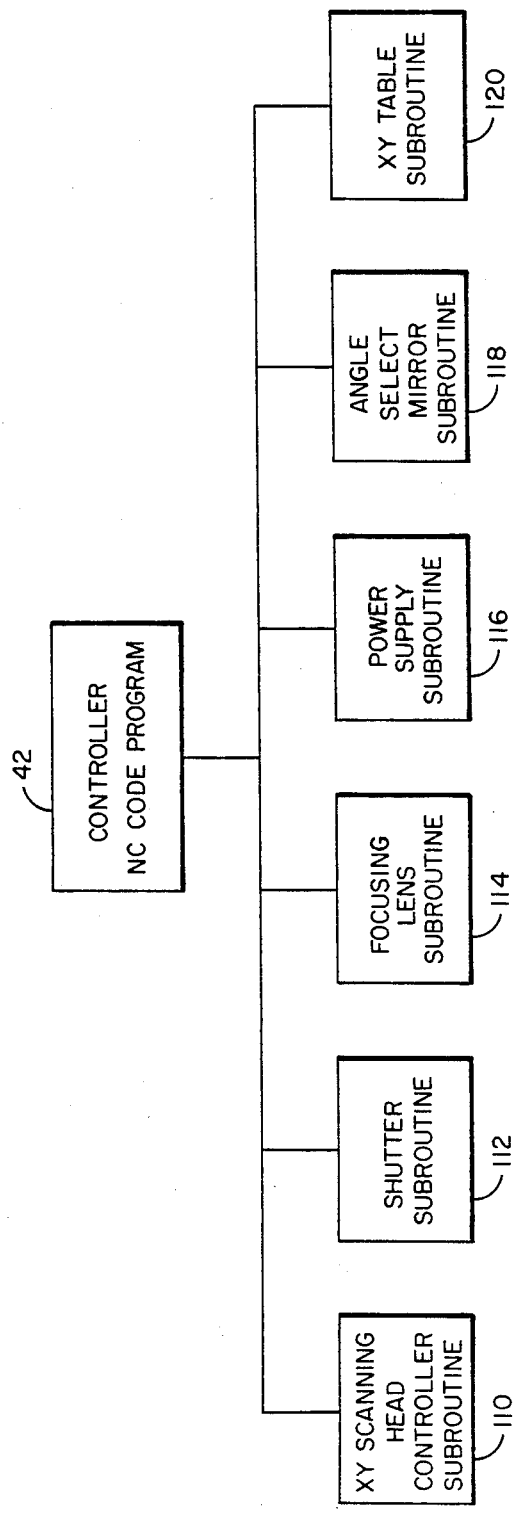
FIG. 2 is a block diagram of software provided by the controller for controlling a plurality of elements of the present invention.

The controller 42 also drives the focusing lens 22 by providing signals to cause movement of the lens in the axial direction to bring the focal point of the laser beam above or below the workplane 35, thereby effectively changing the laser beam spot size at the workpiece 33. The controller 42 directs the movements of the XY table 34 for positioning points to be soldered on a workpiece 33. The angle select mirror 26 is positioned under the control of controller 42 for selecting the particular one of the reflecting mirrors 28–32 to produce the laser beam angle of incidence desired for a point being soldered. The controller 42 may be embodied by an ANOMATIC II controller manufactured by Anorad of Haupauge, N.Y. A block diagram of the software required with the controller 42 is shown in FIG. 2 which actively controls the elements of the laser soldering system 10 such as the XY scanning head controller 20, shutter 13, focusing lens 22, power supply 11, angle select mirror 26 and XY table 34. An NC code program is provided with an ANOMATIC II controller 42 and the subroutines 110–120 for each of the actively controlled elements are readily know or determined by one skilled in the art in accordance with specific application soldering requirements.

A coaxial TV image is obtained on an operator's monitor (not shown) by placing a TV camera 40, a coaxial illuminator 36 and a beam splitter 38 above the dichroic mirror 24 whereby the dichroic mirror reflects a major portion of the laser beam to a workpiece 33 on the workplane 35 and at the same time passes via the beam splitter 38 the image of the workpiece 33 illuminated by coaxial illuminator 36 and the reflection of the laser spot into the TV camera 40. A dichroic mirror is an optical element which reflects and transmits the required percentages of electromagnetic radiation for two specific wavelengths or wavelength bands. In the present embodiment, the dichroic mirror is designed to have a maximum reflectivity at 1.06 microns and sufficient transmission in the visable band for television viewing. The invention provides for a true coaxial viewing of the workpiece 33 positioned on the workplane 35 for any angle selected by the angle select mirror 26.

The angle select mirror 26 is positioned at one focus of an ellipse and the workpiece 33 positioned at the other focus. Flat mirrors 28, 30, and 37 are positioned tangent to the locus of the ellipse in such a manner that the laser beam impingment angle of incidence at the point of impingement on the workpiece 33 can be selected by rotation of the angle select mirror. The laser beam is directed via a path (P2) normal to the workpiece 33 or at angles of ±15 degrees (paths P1 and P3) from the normal. Because of the inherent properties of an ellipse described hereinbefore the pathlength of the laser beam will be the same regardless of which one of the three paths P1, P2, and P3 illustrated in FIG. 1 is chosen. Because the pathlength is constant, the spot size and the television viewing focus are also constant. In addition, the point of beam impingment onto the workpiece 33 is constant and independent of which angle is selected.

The shape or pattern of the area to be soldered is programmed into the computer 18 such that upon command, the two-axis galvanometer scanner 16 will scan the laser spot over the selected pattern. This pattern may be repeated many times at a rate up to 40 hertz which simulates a constant heating source with a programmed shape and time interval. A thermal time constant for any workpiece may be described as the product of its thermal resistance having units of degree (centigrade) per watt and its thermal capacitance having units of watt-seconds per degree (centigrade). One thermal time constant having units of seconds is the time required for the body to cool 36.8% of the way to ambient temperature assuming no additional heat input. Thus by scanning a solder joint on a workpiece with the laser beam at a rate of approximately 10 times its thermal time constant, the joint will cool only a few degrees between scans permitting the entire joint to be molten simultaneously.

In addition to the controller 42, the other major components of the laser process system 10 required to implement the embodiment shown in FIG. 1 are as follows: the laser 12 may be embodied by a CW Nd:YAG, model 116F manufactured by Quantronix of Smithtown, N.Y.; the power supply 11 is model 204-32X, manufactured by Quantronix of Smithtown, N.Y.; the shutter 13 is model 319 manufactured by Quantronix of Smithtown, N.Y.; the telescope 14 is model 306 telescopic beam expander 4X manufactured by Quantronix of Smithtown, N.Y.; the two-axis galvanometer scanner 16 is model XY 2030 manufactured by General Scanning Inc. of Watertown, Mass.; the XY scanning head controller 20 is a model DX2103 manufactured by General Scanning Inc. of Watertown, Mass.; the computer 18 is model 386/20 manufactured by Compaq Computer Corp. of Houston, Tex. The focusing lens 22 is model ESL 64510P5 manufactured by Raytheon Company of Lexington, Mass. The dichroic mirror 24 is model ESL 64288 manufactured by Raytheon Company of Lexington, Mass. The angle select mirror 26 is model LCU-001-FLAT-GOLD CT manufactured by Spawr Optical Research Inc. of Corona, Calif. The reflecting mirrors 28, 30, 32 are models LCU-001-FLAT-GOLD CT manufactured by Spawr Optical Research Inc. of Corona, Calif. The XY table 34 is model 2887 manufactured by Anrad Co. of Hauppauge, N.Y. The TV camera 40 is Model AVC-D1 manufactured by Sony of Japan. The beam splitter 38 is model 03BTF001 manufactured by Melles Griot of Irvine, Calif. and the coaxial illuminator 36 is model 653 manufactured by American Optical of Southbridge, Mass.

This concludes the description of the preferred embodiment. However, many modifications and alterations will be obvious to one of ordinary skill in the art without departing from the spirit and scope of the inventive concept. For example, the laser process apparatus 10 shown in FIG. 1 may be used for performing selected heat treating of materials, generating markings, or performing annealing, drilling, or welding in addition to soldering. Therefore, it is intended that the scope of this invention be limited only by the appended claims.

What is claimed is:

1. A laser apparatus comprising:
   means for generating a laser beam having a divergence in accordance with a desired impinging spot size of said laser beam on a workpiece;
   means for adjusting said impinging spot size; and
   means for selecting one of a plurality of angles of incidence of said laser beam at said workpiece, said laser beam having a constant pathlength for each of said angles of incidence selected.

2. The laser apparatus as recited in claim 1 wherein:
   said spot size adjusting means comprises a focusing lens means.

3. The laser apparatus as recited in claim 1 wherein:
   said laser beam angle of incidence selecting means comprises an angle select reflecting means.

4. The laser apparatus as recited in claim 3 wherein:
   said laser beam angle of incidence selecting means comprises a plurality of reflecting means positioned tangent to a locus of an ellipse for maintaining said constant laser beam pathlength and constant point of laser beam impingment on said workpiece, one of said plurality of reflecting means being selected to reflect said laser beam reflected from said angle select reflecting means.

5. The laser apparatus as recited in claim 4 wherein:
   each one of said plurality of reflecting means positioned on said locus of an ellipse has a first focus point at the center of said angle select reflecting means and a second focus point at said point of laser beam impingement on said workpiece.

6. The laser apparatus as recited in claim 1 wherein:
   said apparatus comprises a means for viewing said workpiece and said spot size for anyone of said selected plurality of angles of incidence without having to readjust said spot size.

7. A laser apparatus comprising:
   means for generating a laser beam having a divergence in accordance with a desired impinging spot size of said laser beam on a workpiece;
   means for adjusting said impinging spot size;
   first reflecting means under computer control for selecting one of a plurality of angles of reflection of said laser beam; and
   second reflecting means positioned tangent to a locus of an ellipse for reflecting said laser beam received from said first reflecting means to a point on said workpiece, said laser beam having a constant pathlength for each one of said selected angles of reflection.

8. The laser apparatus as recited in claim 7 wherein:
   said spot size adjusting means comprises a focusing lens means.

9. The laser apparatus as recited in claim 7 wherein:

said second reflecting means comprises a plurality of mirrors positioned tangent to said locus of an ellipse having a first focus point at the center of said first reflecting means and a second focus point at said point on said workpiece.

10. The laser apparatus as recited in claim 7 wherein:
said apparatus comprises a means for viewing said workpiece and said spot size for anyone of said selected plurality of angles of incidence without having to readjust said spot size.

11. A laser apparatus comprising:
means for generating a laser beam having a divergence in accordance with a desired impinging spot size of said laser beam on a workpiece;
means for programming a plurality of shapes of said laser beam to produce a plurality of different heating pattern on said workpiece;
means for adjusting said impinging spot size; and
means for selecting one of a plurality of angles of incidence of said laser beam at said workpiece, said laser beam having a constant pathlength for each of said angles of incidence selected.

12. The laser apparatus as recited in claim 11 wherein:
said programming means comprises a two-axis galvanometer scanner means under computer control.

13. The laser apparatus as recited in claim 11 wherein:
said spot size adjusting means comprises a focusing lens means.

14. The laser apparatus as recited in claim 11 wherein:
said laser beam angle of incidence selecting means comprises an angle select reflecting means under computer control.

15. The laser apparatus as recited in claim 14 wherein:
said laser beam angle of incidence selecting means comprises a plurality of reflecting means positioned tangent to a locus of an ellipse for maintaining said constant laser beam pathlength and constant point of laser beam impingement on said workpiece, one of said plurality of reflecting means being selected to reflect said laser beam reflected from said angle select reflecting means.

16. The laser apparatus as recited in claim 15 wherein:
each one of said plurality of reflecting means positioned on said locus of an ellipse has a first focus point at the center of said angle select reflecting means and a second focus point at said point of laser beam impingement on said workpiece.

17. The laser apparatus as recited in claim 11 wherein:
said apparatus comprises a means for viewing said workpiece and said spot size for anyone of said selected plurality of angles of incidence without having to readjust said spot size.

18. A laser soldering system comprising:
means for generating a laser beam having an adjustable power level and duration;
means positioned in a path of said laser beam for controlling the divergence of said laser beam in accordance with a desired impinging spot size on a workpiece;
means for shaping said laser beam emerging from said divergence controlling means to produce a desired heating pattern on said workpiece;
means for focusing said impinging spot size of said laser beam on said workpiece;
means for reflecting said laser beam while simultaneously transmitting visible light from said workpiece to a camera lens means;

means for selecting one of a plurality of angles of incidence of said laser beam at said workpiece to be soldered while maintaining a constant laser beam pathlength and constant point of laser beam impingement on said workpiece; and
means for controlling said laser soldering system in accordance with soldering requirements of said workpiece.

19. The laser soldering system as recited in claim 18 wherein:
said simultaneously reflecting and transmitting means comprises a dichroic mirror means for passing to said camera lens means an image of said workpiece and an image of said laser beam spot on said workpiece.

20. The laser soldering system as recited in claim 19 wherein:
said system comprises means for illuminating said workpiece for viewing by said camera lens.

21. The laser soldering apparatus as recited in claim 18 wherein:
said angle of incidence selecting means comprises an adjustable mirror means for directing said laser beam to one of a plurality of reflecting mirrors, each of said reflecting mirrors being positioned tangent to a locus of an ellipse, said ellipse having a first focus point located at the center of said adjustable mirror means and a second focus point located at said workpiece being soldered.

22. A method of generating a localized heating pattern with a laser beam comprising the steps of:
generating said laser beam having a divergence in accordance with a desired impinging laser beam spot size on a workpiece;
adjusting said impinging spot size on said workpiece using a focusing lens; and
selecting one of a plurality of angles of incidence of said laser beam at said workpiece, said laser beam maintaining a constant pathlength for each of said angles of incidence selected.

23. The method as recited in claim 22 wherein:
said step of selecting said laser beam angle of incidence further comprises the step of positioning an angle select reflecting means to direct said laser beam to one of a plurality of reflecting means positioned tangent to a locus of an ellipse having a first focus point at the center of said angle select reflecting means and a second focus point at said point of laser beam impingement on said workpiece.

24. The method as recited in claim 22 wherein:
said step of generating a laser beam further comprises the step of shaping said laser beam to produce said heating pattern on said workpiece.

25. A method of performing laser soldering comprising the steps of:
generating a laser beam having an adjustable power level and duration;
controlling the divergence of said laser beam in accordance with a desired impinging spot size on a workpiece;
shaping said laser beam emerging from a divergence controlling means to produce a desired heating pattern on said workpiece;
focusing said impinging spot size of said laser beam on said workpiece;
reflecting said laser beam while simultaneously transmitting visible light from said workpiece to a camera lens means;

selecting one of a plurality of angles of incidence of said laser beam at said workpiece to be soldered while maintaining a constant laser beam pathlength and constant point of laser beam impingement on said workpiece; and controlling said laser soldering in accordance with soldering requirements of said workpiece.

26. The method as recited in claim 25 wherein: said step of selecting said laser beam angle of incidence further comprises the step of positioning an angle select reflecting means to direct said laser beam to one of a plurality of reflecting means positioned tangent to a locus of an ellipse having a first focus point at the center of said angle select reflecting means and a second focus point at said point of laser beam impingement on said workpiece.

* * * * *